Patented Nov. 11, 1924.

1,515,007

UNITED STATES PATENT OFFICE.

ABRAHAM S. BEHRMAN, OF CHICAGO, ILLINOIS, ASSIGNOR TO INTERNATIONAL FILTER COMPANY, OF CHICAGO, ILLINOIS, A CORPORATION OF ILLINOIS.

BASE-EXCHANGE MATERIAL AND PROCESS OF MAKING SAME.

No Drawing. Application filed October 8, 1923. Serial No. 667,416.

*To all whom it may concern:*

Be it known that I, ABRAHAM S. BEHRMAN, a citizen of the United States, residing at Chicago, in the county of Cook and State of Illinois, have invented certain new and useful Improvements in Base-Exchange Materials and Processes of Making Same, of which the following is a specification.

This invention relates in general to the production of base exchange materials and in particular to a new and improved process for preparing synthetically a double base exchange silicate from solutions of alkali metal silicates and salts of amphoteric metals. By the term "amphoteric metal", which is used for the sake of conciseness throughout the specification and in the claims, I mean a metal whose hydroxide or oxide is amphoteric and therefore can function either as an acid or as a base; by the term "salt of an amphoteric metal" I mean a salt which may be regarded as having been formed by the functioning of such amphoteric hydroxide or oxide as a base in the presence of an acid—that is to say, the "amphoteric metal" will be found in the positive radicals or ions of such salt in solution, while the acid group will be found in the negative radicals or ions. As thus defined for the purposes of this specification, a typical example of "a salt of an amphoteric metal" is aluminum sulphate.

An object of the present invention is to provide a method of procedure in the preparation of base exchange silicates which is far less complicated and more economical than those previously employed or advocated.

Another object is to prescribe a method which will produce a desired end product of uniform composition, capacity and stability.

A further object and perhaps the most important feature of my invention is the production of a base exchange material having greater capacity, higher efficiency and in all respects being better adapted for the technical uses to which such materials are commonly applied, than any natural or artificial zeolite heretofore known.

The art of base exchange utilization traces its genesis many years back. In 1852 Way disclosed (Journal Royal Agricultural Society, 1852, p. 129) the composition and formation of double silicates of aluminum and sodium, and in 1866 Haushofer (Jour. f. Pracktische Chemie. Vol. 99, page 241) described the preparation of a number of double silicates by the action of various salts on solutions of water glass.

In the subsequent development of the art those proponents of what might be called the wet, or precipitation, method of preparing these base exchange materials, as distinguished from processes employing substantially dry ingredients and heat sufficient to cause sintering or fusion, have prescribed and followed practices which, generally speaking, start with dilute solutions of silicates and of salts, and in the course of treatment separate or remove the mother liquor entirely or in large part, employ various agencies to aid or control the precipitation, filterpress, wash, and otherwise treat the precipitate, and require such other special steps as are incidental to the individual treatments followed. In all cases, extensive and costly apparatus is required and special handling and considerable time involved in carrying out the various steps of treatment.

The present invention proceeds along lines directly opposed to the teachings of the prior art, in starting with concentrated solutions of the silicates and salts and retaining in the reaction mass, for a definite purpose, substantially all of the constituent elements of the reagents employed. Separation of the mother liquor is to be carefully avoided.

Upon this predicate I have found that the solutions heretofore most commonly employed may be brought together in such volume, degrees of concentration and proportions that by merely mixing the ingredients at the proper temperature, reaction will occur to form a gel from the reaction materials, which upon drying will yield a double base exchange silicate having physical and chemical properties far superior to those heretofore resulting from any of the previously prescribed methods of treatment.

In exemplification of my invention I shall present what I now consider to be a preferred method of procedure. I take 75 liters of an aqueous solution of commercial aluminum sulphate, containing 52.1 grams per liter, and I dilute 21.3 kg. of commercial water glass (containing about 9% $Na_2O$ and 28.5% $SiO_2$) to 75 liters with water. I cool these solutions separately to nearly 0° C. and bring them into contact, as by mixing in an open container the mixing temperature being about 5° C. Almost immediately upon mixing a gel forms, occupying the entire volume of the reacting liquids. After this gel has set, it is thoroughly dried at a low heat, preferably under 100° C. and best between 60 and 80° C. The gel may be broken up before drying, or dried en masse, depending on the manufacturing facilities available. As a result of drying, the material shrinks and resolves into small hard lumps which may be broken up into smaller particles if desired.

An important advantage following the practice of my process as outlined is in the fact that the sodium salts formed during the reaction, enter into the structure of the dried material, and being soluble in water, are removed in subsequent leaching, leaving the particles highly porous and with increased surface area available for contact with solutions to be subjected thereto for treatment in an exchange of bases. Calculated on the anhydrous basis, the sodium sulphate resulting from the reaction in the example cited will constitute about 25 per cent by weight of the total solids, whereas in materials of this class prepared according to prior methods, the content of soluble salts retained does not approach even 10 per cent. After the soluble salts have been removed by leaching and the particles have been dried, the material, upon rewetting, will absorb in its pores water in excess of 30 per cent of the weight of the dried material.

By operating at low temperatures it is possible to prepare a smoother and more homogeneous gel, and with smaller quantities of water than if normal room temperatures are employed. The gel formed at low temperatures dries to a harder and otherwise more desirable product. Moreover, it is thus possible to preserve the reaction mixture in a fluid or semi-fluid condition longer than if normal temperatures were employed, providing for greater freedom in mixing and handling.

The resultant product of the practice, as followed in the example cited, has a very high base exchange capacity, sometimes exceeding 200 grains calcium carbonate equivalent per pound. It possesses great hardness, strength and durability. The particles are of yellowish or creamy color and the end product is alkaline to phenolphthalein.

The apparent density of a mass of the dried particles of sodium aluminum silicate so produced may be as high as forty pounds per cubic foot, or possibly higher. This density is considerably greater than that of the sodium aluminum silicates heretofore produced by wet method reactions, even than those subjected to fairly great filter pressures of 100 to 150 pounds per square inch. Incidentally the filter cake subjected to such pressures contains about 90% of moisture, whereas the gel formed during the practice of my invention can be made to contain no greater per cent than this at any stage of the operation.

Various modifications in volume, composition and concentration of the reagents are permissible. For instance, it may be desired to use the aluminum sulphate in more concentrated, and the sodium silicate in more dilute solutions than I have specified in the example. Or one may start with solutions of other and equivalent amphoteric metals such as iron, chromium, zinc, etc., or with potassium silicate. Or the ratio between alkali metal oxide, amphoteric metal oxide, and silica may be altered as by the addition of an alkali metal hydroxide such as caustic soda. The porosity of the end product may be increased by the addition of inert soluble salts, and as a hardening agent, I suggest the addition to the reaction mixture of a solution of a compound of an alkaline earth metal, as for example, calcium sulphate, or calcium chloride.

In the example cited, a total volume of 150 liters is proposed. This, of course, might be varied to some extent, but beyond a range of from 100 to 200 liters the full advantage of the process will scarcely be realized.

While separation of the mother liquor is, in general, to be avoided, it is possible, by variations in temperatures, volumes, proportions and concentrations of the reacting solutions, to approximate the results obtained by strict adherence to the preferred procedure, by causing a gel to form which will not occupy the entire volume of the reacting solutions, in other words, one which permits some separation of mother liquor. In other cases a gel may be produced which, when first formed, occupies substantially the entire volume of the reacting solutions, but which, upon standing or in subsequent handling before drying, suffers a separation of mother liquor. The products so alternatively prepared may be suitable for some purposes, but I do not consider them or the methods of preparing them as desirable as the procedure I suggest as preferred, and the products resulting therefrom.

Other variations in the procedure I have outlined may occur to those skilled in the art and be desirable in special circumstances. All modifications within the legitimate scope of my invention are contemplated in connection with the present disclosure and are to be considered as embraced within the definition of the invention as set forth in the appended claims.

Base exchange materials prepared according to my invention are well adapted for technical purposes. The sodium aluminum silicate resulting from the practice outlined in the example cited above, will have great efficiency in the softening of water. In this operation the exchangeable sodium in the particles is replaced by the calcium and magnesium in the hard water which is subjected to treatment by being brought into contact with the zeolites. When the zeolites have given up all of their replaceable sodium and have thereby become exhausted for further similar exchange they may be readily regenerated or revived by a treatment with a solution of an alkali metal salt such as sodium chloride. The regenerating solution is relieved of its sodium content by contact with the zeolites, which give up in return the calcium and magnesium previously collected from the hard water. Apparatus now commonly employed for utilization of zeolites will be found suitable for use with the product of this invention.

I claim:

1. The process of producing a base exchange material which comprises mixing a solution of a salt of an amphoteric metal with a solution of an alkali metal silicate to form a gel embracing substantially all of the constituent elements of the mixture.

2. The process of producing a base exchange material which comprises mixing a solution of a salt of an amphoteric metal with a solution of an alkali metal silicate to form a gel embracing substantially all of the constituent elements of the mixture, and then drying the mass.

3. The process of producing a base exchange material which comprises mixing a solution of a salt of an amphoteric metal with a solution of an alkali metal silicate to form a gel substantially throughout the entire reaction volume, and then drying the mass.

4. The process of producing a base exchange material which comprises mixing a solution of a salt of an amphoteric metal with a solution of an alkali metal silicate at a temperature of about 5° C.

5. The process of producing a base exchange material which comprises mixing a solution of a salt of an amphoteric metal with a solution of an alkali metal silicate at a temperature of about 5° C. to form a gel throughout all or nearly all of the entire reaction volume and then drying the mass.

6. The process of producing a base exchange material which comprises mixing a solution of a salt of an amphoteric metal with a solution of an alkali metal silicate to form a gel embracing substantially all of the constituent elements of the solutions, and then drying the mass at a temperature not above 100° C.

7. The process of producing a base exchange material which comprises mixing a solution of a salt of an amphoteric metal with a solution of an alkali metal silicate to form a gel embracing the constituent elements of the solutions, drying the mass and then leaching.

8. The process of producing a base exchange material which comprises mixing a solution of a salt of an amphoteric metal with a solution of an alkali metal silicate to form a gel embracing the constituent elements of the solutions, and then drying the mass to remove all of the moisture.

9. The process of producing a base exchange material which comprises mixing a solution of a salt of an amphoteric metal with a solution of an alkali metal silicate in such volume, proportions and concentration as to form a homogeneous gel substantially throughout the entire volume of the reaction mass and then drying the gel.

10. The process of producing a base exchange material which comprises mixing at a temperature of about 5° C. a solution of a salt of an amphoteric metal with a solution of an akali metal silicate in such volume, proportions and concentration as to form a gel embracing the constituent elements of the reacting solutions, and drying the gel.

11. A double base exchange silicate in which practically all of the soluble substances formed by reaction of the constituent solutions are retained in the precipitate.

12. A base exchange material in which the soluble substances formed by reaction of the constituent solutions are retained until after the material has assumed a rigid physical structure.

13. A base exchange material in which substantially all of the soluble salts formed in the reaction between the ingredients of the material are retained until after the material has assumed a rigid physical structure.

14. A base exchange material in which substantially all of the soluble substances formed in the reaction between the ingredients of the material are retained until after the material has been dried.

15. A base exchange material from which the soluble salts formed in the reaction between the ingredients of the material are removed only after the material has assumed its ultimate rigid physical structure.

16. A base exchange material characterized in that prior to leaching the dry mass formed by mixture of solutions of a salt of an amphoteric metal and an alkali metal silicate embodies in the physical structure thereof substantially all of the constituent elements of the reagents employed.

17. A base exchange silicate produced from the reaction of solutions of salts of amphoteric metals and alkali metal silicates, having a density of forty pounds per cubic foot or above.

18. A base exchange silicate produced from the reaction of solutions of salts of amphoteric metals and alkali metal silicates having an exchange capacity of 200 grains calcium carbonate equivalent per pound or above.

19. A base exchange silicate produced from the reaction of solutions of salts of amphoteric metals and alkali metal silicates having an exchange capacity of 8000 grains calcium carbonate equivalent per cubic foot or above.

20. The process of producing a base exchange material which comprises mixing a solution of aluminum sulphate with a solution of sodium silicate in such proportions and degrees of concentration that the resulting gel will embrace and retain all of the constitutent elements of the solutions.

21. The process of producing a base exchange material which comprises mixing a solution of aluminum sulphate with a solution of sodium silicate in such proportions and degrees of concentration as to form a gel embracing substantially all of the constitutent elements of the solutions, then drying the gel to remove all of the moisture.

In testimony whereof I have hereunto subscribed my name.

ABRAHAM S. BEHRMAN.